United States Patent
Hong et al.

(10) Patent No.: US 7,540,416 B2
(45) Date of Patent: Jun. 2, 2009

(54) SMART CARD AUTHENTICATION SYSTEM WITH MULTIPLE CARD AND SERVER SUPPORT

(75) Inventors: Jiang Hong, San Jose, CA (US); Sam Wang, San Jose, CA (US); Ke Wei, Sunnyvale, CA (US)

(73) Assignee: Ricoh Company, Ltd., Ohta-ku Tokyo (JP)

( * ) Notice: Subject to any disclaimer, the term of this patent is extended or adjusted under 35 U.S.C. 154(b) by 111 days.

(21) Appl. No.: 11/355,113

(22) Filed: Feb. 14, 2006

(65) Prior Publication Data

US 2007/0187493 A1    Aug. 16, 2007

(51) Int. Cl.
G06K 5/00    (2006.01)
(52) U.S. Cl. ............... 235/382; 235/380; 235/382.5
(58) Field of Classification Search ............ 235/380, 235/492, 382, 382.5; 709/220
See application file for complete search history.

(56) References Cited

U.S. PATENT DOCUMENTS

| | | | | |
|---|---|---|---|---|
| 5,297,148 A | * | 3/1994 | Harari et al. | 714/710 |
| 5,898,830 A | * | 4/1999 | Wesinger et al. | 726/15 |
| 6,557,032 B1 | * | 4/2003 | Jones et al. | 709/220 |
| 7,243,853 B1 | * | 7/2007 | Levy et al. | 235/492 |
| 2001/0048823 A1 | | 12/2001 | Nomura et al. | |
| 2003/0011809 A1 | | 1/2003 | Suzuki et al. | |
| 2003/0014315 A1 | | 1/2003 | Jaalinoja et al. | |
| 2003/0142990 A1 | | 7/2003 | Weaver | |
| 2004/0190038 A1 | | 9/2004 | Shahindoust | |
| 2005/0094184 A1 | | 5/2005 | Suyehira | |

FOREIGN PATENT DOCUMENTS

| | | |
|---|---|---|
| EP | 0929023 | 7/1999 |
| EP | 1400888 | 3/2004 |
| EP | 1553525 | 7/2005 |
| WO | WO 99/49379 | 9/1999 |

OTHER PUBLICATIONS

European Patent Office, "European Search Report", Application No. EP 07252254, dated Nov. 11, 2008, 7 pages.

* cited by examiner

*Primary Examiner*—Michael G Lee
*Assistant Examiner*—Rafferty Kelly
(74) *Attorney, Agent, or Firm*—Hickman Palermo Truong & Becker LLP (57) ABSTRACT

An approach is provided for a smart card authentication solution utilizing dynamically configurable data to authenticate unrecognized smart cards and communicate with back-end systems not supported by a default environment. The data may be dynamically reconfigured by a user to reflect changes in the authentication environment such as a new smart card type, new data model on a card, or new remote authentication mechanism.

20 Claims, 5 Drawing Sheets

SMART CARD AUTHENTICATION SYSTEM WITH MULTIPLE CARD AND SERVER SUPPORT

FIELD OF THE INVENTION

This invention relates generally to authentication systems, and more specifically, to an approach for smart card authentication systems supporting multiple cards and servers.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Companies rely on printing devices for everyday operations. Often many printing devices are available in a single building or department, each potentially having several functions. Companies desire to monitor and control access to, and track usage of, these devices. One approach to accomplish this is the use of "smart card" systems. These systems use physical cards capable of storing information, usually on an embedded microchip. The smart card may contain data personally identifying a user. This data often conforms to a schema, or data model. A card reader capable of accessing this information is connected to the printing device and communicates with the device.

For example, a user desiring to use a printing device inserts a smart card into a smart card reader connected to the printing device. The smart card reader extracts authentication data, such as a user name and password, from the card and may compare the data to data stored on the printing device or on a backend system, often remote, for authentication purposes. Once the user is authenticated, information may be communicated to the printing device based on the user's credentials. This information could come from the data on the smart card or from another source.

For example, one user may not be able to access color printing capability on a printing device while another user may only be allowed to utilize the scanning capability of a device.

The disadvantage of this approach to authentication is a lack of flexibility in adjusting the authentication system to utilize different card types and authentication systems. One example is that a user of the aforementioned system may want to use a new card type or model. Another example is that a user of the aforementioned system may want to change the data model on the smart cards. Another example is that a user of the aforementioned system may want to use a different backend authentication system by changing servers, protocol types, or other aspects of the system. Another example is that a user of the aforementioned system may want to support a new customer with a different environment after the application controlling the authentication has already been developed, compiled and released.

One approach to the problem has been to rewrite and recompile the authentication application to support the new smart card types, data models, backend authentication systems or new environment. There are many drawbacks to this approach. One, it can take a great deal of time and effort to rewrite and recompile the new applications. If the changes are minor, for example, adding a new server address to the backend authentication system, the effort is considerably out of proportion to the amount of change. Two, it would be prohibitively expensive for users to upgrade authentication applications on a regular basis to support new customers and new cards or data models. Therefore, a need exists to maximize the flexibility with which an authentication system may handle changes to the authentication elements such as smart cards and data models.

SUMMARY

An approach is provided for a smart card authentication solution utilizing dynamically configurable data to authenticate smart cards and communicate with back-end systems not supported by a default environment. The data may be dynamically reconfigured by a user to reflect changes in the authentication environment such as a new smart card type, new data model on a card, or new remote authentication mechanism.

This approach allows users to support new and additional smart cards, data models, and backend authentication systems by defining user-configurable data rather than rewriting and recompiling the authentication application for every desired change, no matter how minor. By utilizing this approach, the smart card authentication system may be quickly and efficiently reconfigured to support new customers, new smart cards, new data models, new backend authentication mechanisms, and other changes.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW

II. ARCHITECTURE AND AUTHENTICATION DETAILS

III. LOCAL USER CREDENTIAL AUTHENTICATION

IV. SERVER-BASED USER CREDENTIAL AUTHENTICATION

V. WEB-BASED INTERFACE

VI. IMPLEMENTATION MECHANISMS

I. Overview

An approach is provided for a smart card authentication solution utilizing dynamically configurable data to authenticate unrecognized smart cards and communicate with backend systems not supported by a default environment. The data may be dynamically reconfigured by a user to reflect changes in the authentication environment such as a new smart card type, new data model on a card, or new remote authentication mechanism.

According to one embodiment of the invention, a smart card authentication module communicates with a smart card reader to retrieve authentication data. The smart card authentication module contains support for one or more default smart card types and data models. When a user desires to use an unsupported card type or data model, instead of rewriting the software controlling the smart card authentication module, separate data accessible by the smart card authentication module is dynamically reconfigured to recognize the new card type and/or data model and provide instructions to retrieve the new user credential information. In one embodiment, this is accomplished by creating and storing a user-defined configuration file accessible by the smart card authentication module that is accessed when the default pre-defined card type and/or data model is insufficient to authenticate a user.

According to one embodiment of the invention, a user-defined configuration file is used to support a new backend authentication system not supported by the default environment. Once a user changes or switches a backend authentication server to a new protocol, for example, the user-defined configuration file is used by the smart card authentication module to communicate with the backend server to authenticate a user without rewriting the entire authentication system application. According to an embodiment, the smart card authentication module may be divided into separate modules for the purpose of local versus remote authentication.

One embodiment of this approach involves a web-based user interface to allow a user to easily change the user-defined configuration files used by the smart card authentication module.

The approaches discussed within allow users to support new and additional smart cards, data models, and backend authentication systems by defining user-configurable data rather than spending time and money rewriting and recompiling the authentication application for every desired change, no matter how minor. By utilizing the approaches described herein, the smart card authentication system may be quickly and efficiently reconfigured to support new customers, new smart cards, new data models, and new backend authentication mechanisms.

II. Architecture and Authentication Details

Figure 1:
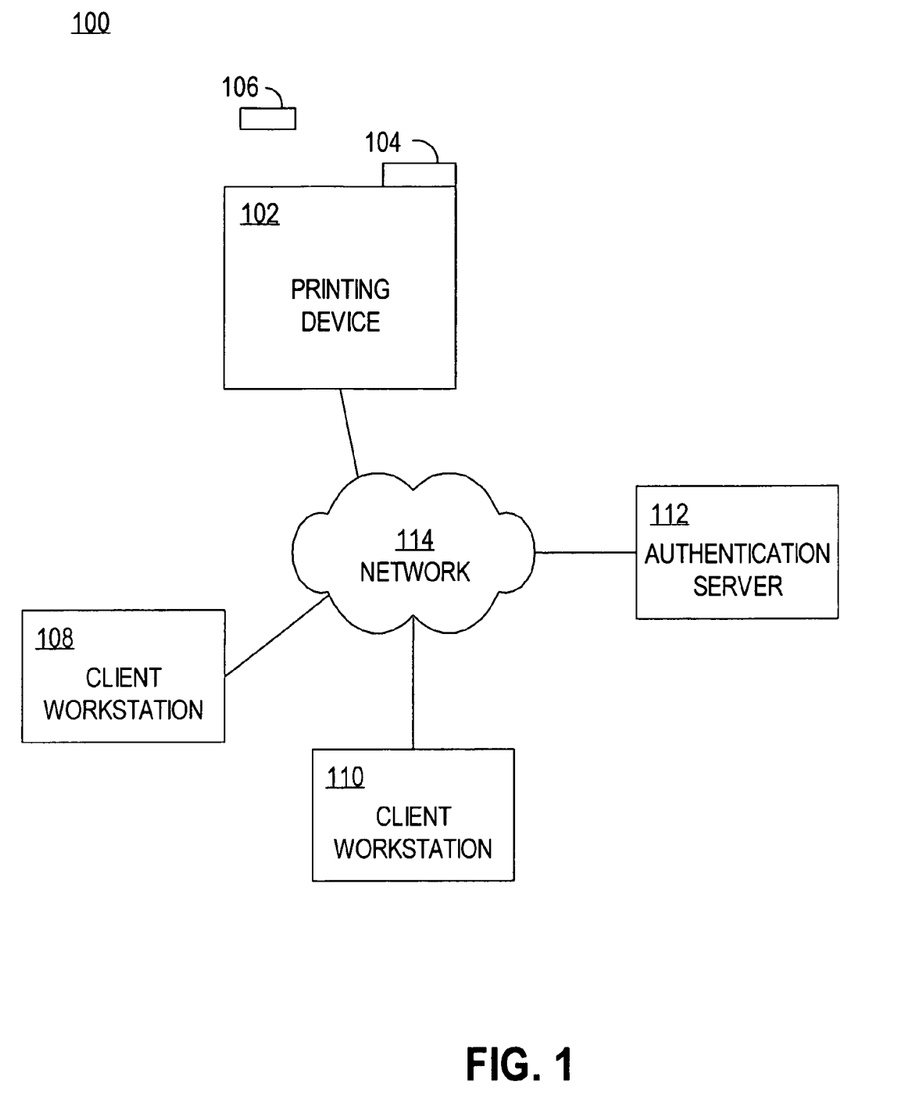
FIG. 1 is a block diagram that depicts an arrangement for a smart card authentication solution according to one embodiment of the invention.

FIG. 1 is a block diagram that depicts an arrangement 100 for a smart card authentication system according to one embodiment of the invention. Arrangement 100 includes at least one printing device 102 capable of storing, processing and accessing data related to user authentication and capability. Examples of printing device 102 include, without limitation, a copier, a printer, a scanner and a multifunction device (MFP). In one embodiment of the invention, the printing device is capable of executing authentication modules in memory and from electronic storage. For example, printing device 102 may execute authentication software that controls the reading of data from smart cards and query that data against a database stored local to the printing device 102 or remotely. Upon successful authentication of a user, the printing device identifies functions available for the user based on the result of the authentication procedure and controls the user's access to functions on the printing device 102 accordingly.

The printing device 102 is communicatively coupled to a card reader 104 capable of receiving and reading data stored on one or more smart cards 106. The card reader 104 may be capable of communicating information to a user through the use of a display. Further, the card reader 104 is capable of sending and receiving information to and from the printing device 102. The smart card 106 is capable of storing data; for example, on a microchip embedded in the card. In an embodiment of the invention, the card reader 104 reads the data from the microchip. The data stored on the smart card 106 may conform to a certain model or schema; for example, the card may store a user's name, social security number, employee ID, and date of birth. Another card may use a different data model, such as name, address, eye color and employee number.

The printing device 102 and the card reader 104 may be communicatively coupled to one or more client workstations 108, 110 and/or backend authentication servers 112 via a network 114. Network 114 may be implemented by any medium or mechanism that provides for the exchange of data between printing device 102 and client workstations 108, 110 and/or backend authentication server 112. Examples of network 114 include, without limitation, a network such as a Local Area Network (LAN), Wide Area Network (WAN), Ethernet or the Internet, or one or more terrestrial, satellite or wireless links. Portions of network 114 may be wired connections, while other portions may be wireless connections, depending upon a particular implementation. For example, the connection between the printing device 102 and one workstation 108 may be a wired connection, while the connection between the backend authentication server 112 and the printing device 102 may be a wireless connection.

Components of the workstations 108-110 work in concert or separately to communicate data to the printing device 102. For example, a user at a workstation 108 may cause data describing a print job to be communicated from the workstation 108 to the printing device 102. According to an embodiment, the print job will not be completed until the user is authenticated using the approaches described herein.

A backend authentication server 112 may be used as part of an authentication process as described herein. According to an embodiment, the backend authentication server 112 is capable of communicating with the printing device 102. User credentials may be read from a smart card and communicated to the backend authentication server 112 by the authentication software executing on the printing device 102. The backend authentication server 112 authenticates the credentials and returns data to the printing device 102 reflecting the result of the authentication. This data may include whether the user has been authenticated and what functions are available for the user based on the result of the authentication procedure. According to an embodiment, the backend authentication server 112 is capable of authenticating users based upon various types of authentication approaches such as certificate-based authentication procedures, LDAP entries, and other approaches.

III. Local User Credential Authentication

Figure 2:
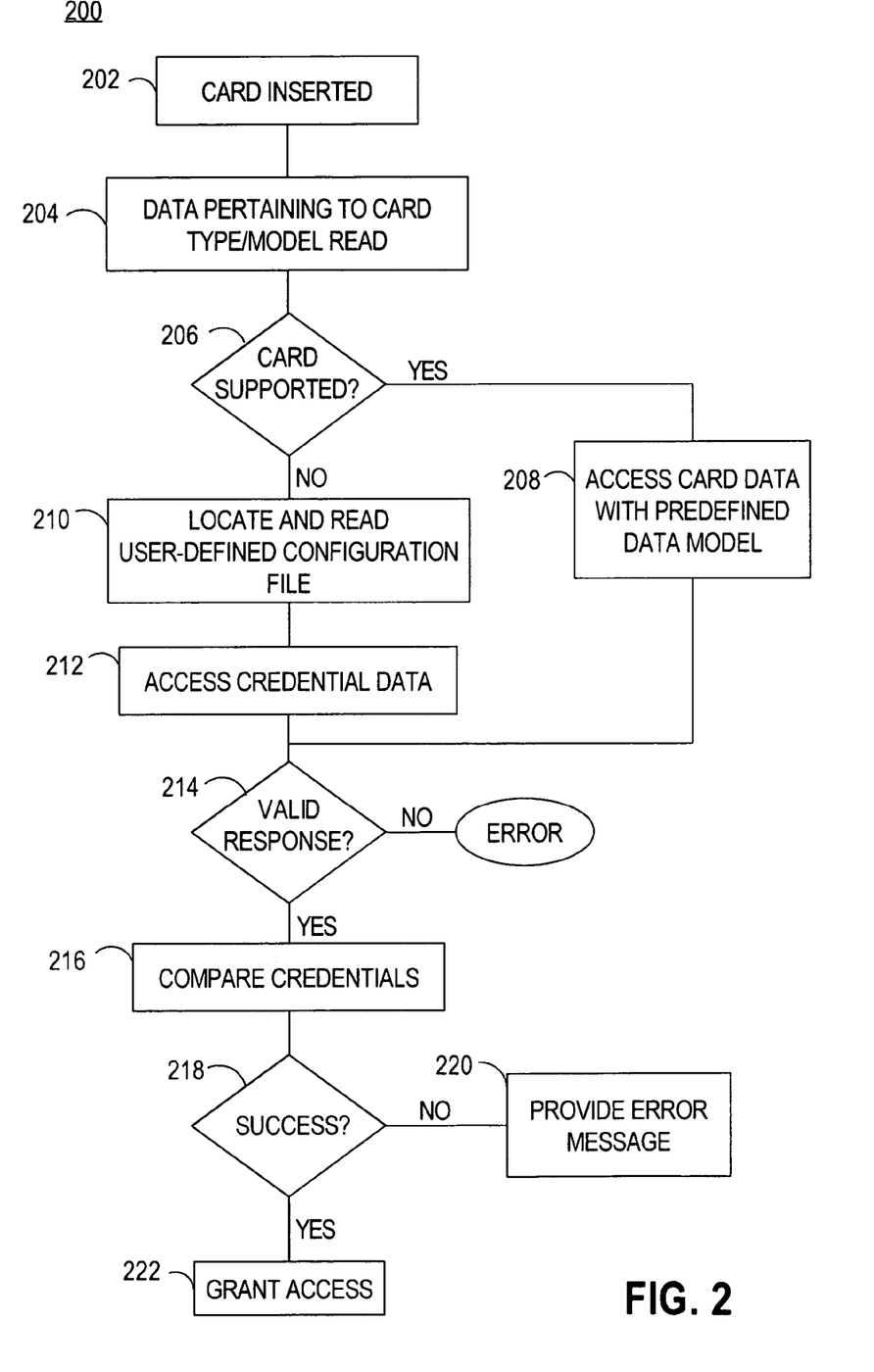
FIG. 2 is a flow diagram that depicts an approach for smart card authentication, according to an embodiment of the invention.

FIG. 2 is a flow diagram 200 that depicts an approach for local smart-card based authentication according to an embodiment of the invention. In step 202, a user inserts a smart card into a card reader communicatively coupled to the printing device. In one embodiment of the invention, the card reader reads stored data from the smart card and communicates data sufficient to identify the smart card and type to a process executing on the printing device. The card reader may read and communicate all data stored on the card or may first only provide limited information to the printing device for the purpose of authentication. For example, the card reader may only extract and communicate information related to the smart card type and model.

In step 204, a smart card authentication module executing on the printing device, or on a device capable of communicating with the printing device, uses the data from step 202 to determine if the card is of a supported type and model. As described earlier, smart card authentication systems are often delivered and distributed with default software and data pertaining to smart card types and data models supported by the default setup. According to an embodiment, a smart card authentication system executes software, or modules, capable of reading certain card types and models, recognizing and reading certain data models stored on the card, and using certain backend authentication servers and protocols. If the inserted card type or model, for example, is not supported by the default software, then prior to this approach the default software would have to be rewritten and recompiled on each printing device in order to support the unrecognized card type or model.

In step 206, a check is made to determine if the card type and model are supported. If the response is yes, then the card is a known card to the authentication software and this is communicated to the card reader in addition to data instructing the card reader to retrieve specific user credentials according to a predefined data model. In step 208, the card reader accesses the card data according to a predefined data model, reads the user credentials from the card and communicates the credentials to an authentication module executing on the printing device. As part of this step or another step, a PIN code or similar data may be required to be entered prior to accessing the smart card.

For example, the default authentication software may recognize a certain card type and model and identify the user credentials required for that card type and model to be a user name and password stored on the smart card. The user name and password is the data model for this particular authentication. As described earlier, the data model may be comprised of any amount or type of data. In one embodiment, the data communicated to the card reader includes data describing the data model associated with the card type and/or model and this data instructs the card reader how to access this particular data model. According to an embodiment, data retrieved from the card indicates whether the authentication may be completed locally or must occur at a remote device.

If the response to step 206 indicates that the card type and/or model is not supported by the default configuration, then in step 210 the authentication module locates and reads a user-defined configuration file to determine if data exists in the user-defined configuration file supporting the card type and/or model. According to an embodiment, the user-defined configuration file may be a plain text file with field separators (e.g., a comma-delimited file), a formatted text file such as an XML file, or other formatted data. The configuration files may have multiple entries to support more than one card model and/or type, and may be edited and deleted. The configuration files may contain commands capable of being understood by the smart card reader that instruct the authentication system how to retrieve the required information needed to authenticate a user. According to an embodiment, the configuration file contains commands the authentication module may use to retrieve the required information from a card comprising a type or data model unsupported by the default authentication module. The configuration file may also contain user-defined data models capable of being utilized by the authentication module. According to an embodiment, encryption techniques and other methods may be utilized to restrict access to the user-defined configuration files.

According to an embodiment, separate user-defined configuration files reside on the printing device and are accessible by the smart card authentication module. One configuration file defines smart card models/types, data models, password options, and user credential retrieval commands for local authentication, i.e., authentication that does not require accessing a separate or remote authentication server. Another configuration file may define server addresses, protocol types, and data formats pertaining to remote authentication procedures. The correct configuration file to use may be based upon the card model and/or type.

In step 212, the smart card reader, according to instructions and data from the user-defined configuration file, accesses user credential data on the smart card. The user credential data can be predefined, as in supported by the default software, or customer defined using the configuration file. It may take the form of a user ID and password, a LDAP entry, a PKI certificate, or other form of identification. As part of this step or another step, a PIN code or similar data may be required to be entered prior to accessing the smart card.

In step 214, a check is made to see whether a valid response was received. If not, then an error message or similar feedback may be provided to the user and the card ejected.

In step 216, the authentication software compares the retrieved credentials with a database local to the printing device. According to alternate embodiments, the credentials may be compared to data not stored in a database format and may be compared to data stored remotely.

In step 218, a check is made as to whether the data comparison results in a successful authentication. If the authentication is unsuccessful, then an error message or similar feedback may be provided to the user and the card ejected 220.

If authentication is successful, then in step 222 access is granted to the user commensurate with the user's authorized functions. For example, the printing device may use the user information to access a local function controlling database and determine the device functions that the user may utilize. This may be applied to various functions, such as color printing allowance or scan-to-email allowance. Other resource controlling functions or applications, such as an accounting system, may be built on top of the smart card authentication system.

IV. Server-Based User Credential Authentication

Figure 3:
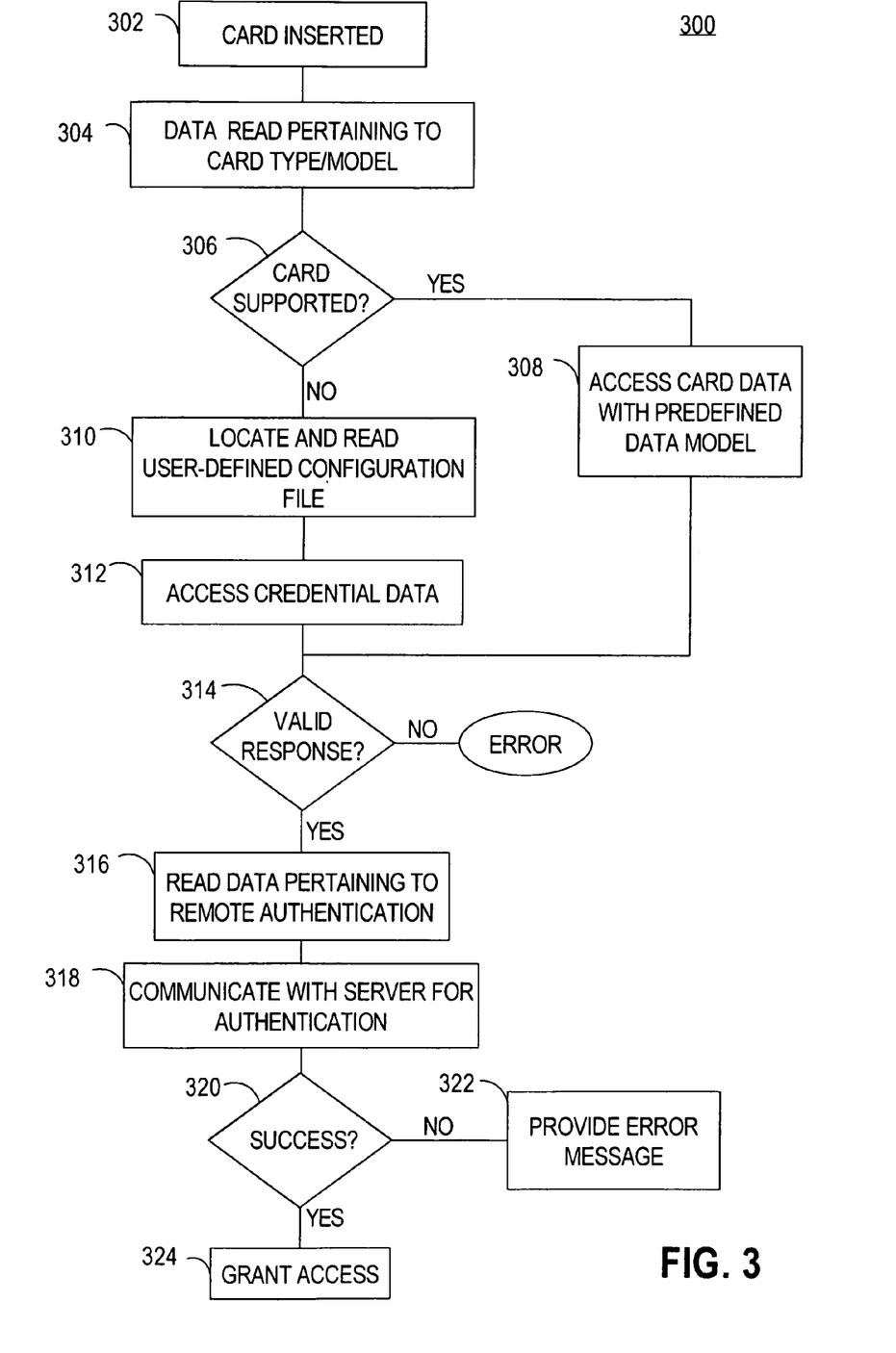
FIG. 3 is a flow diagram that depicts an approach for smart card authentication, according to another embodiment of the invention.

FIG. 3 is a flow diagram 300 that depicts an approach for a server-based smart-card authentication according to an embodiment of the invention. In step 302, a user inserts a smart card into a card reader communicatively coupled to the printing device. In one embodiment of the invention, the card reader reads stored data from the smart card and communicates data sufficient to identify the smart card and type to a process executing on the printing device. The reader may read and communicate all data stored on the card or may first only provide limited information to the printing device for the purpose of authentication. For example, the card reader may only extract and communicate information related to the smart card type and model.

In step 304, a smart card authentication module executing on the printing device, or on a device capable of communicating with the printing device, uses the data from step 302 to determine if the card is of a supported type and model. As described earlier, smart card authentication systems are often delivered and distributed with default software and data pertaining to smart card types and data models supported by the default setup. According to an embodiment, a smart card authentication system executes software, or modules, capable of reading certain card types and models, recognizing and reading certain data models stored on the card, and using certain backend authentication servers and protocols. If the inserted card type or model, for example, is not supported by the default software, then prior to this approach the default software would have to be rewritten and recompiled on each printing device in order to support the unrecognized card type or model.

In step 306, a check is made to determine if the card type and model are supported. If the response is yes, then the card is a known card to the authentication software and this is communicated to the card reader in addition to data instructing the card reader to retrieve specific user credentials according to a predefined data model. In step 308, the card reader accesses the card data according to a predefined data model, reads the user credentials from the card and communicates the credentials to an authentication module executing on the printing device. As part of this step or another step, a PIN code or similar data may be required to be entered prior to accessing the smart card.

For example, the default authentication software may recognize a certain card type and model and identify the user credentials required for that card type and model to be a user name and password stored on the smart card. The user name and password is the data model for this particular authentication. As described earlier, the data model may be comprised of any amount or type of data. In one embodiment, the data communicated to the card reader includes data describing the data model associated with the card type and/or model and this data instructs the card reader how to access this particular data model. According to an embodiment, data retrieved from the card indicates whether the authentication may be completed locally or must occur at a remote device.

If the response to step 306 indicates that the card type and/or model is not supported by the default configuration, then in step 310 the authentication module locates and reads a user-defined configuration file to determine if data exists in the user-defined configuration file supporting the card type and/or model. According to an embodiment, the user-defined configuration file may be a plain text file with field separators (e.g., a comma-delimited file), a formatted text file such as an XML file, or other formatted data. The configuration files may have multiple entries to support more than one card model and/or type, and may be edited and deleted. The configuration files may contain commands capable of being understood by the smart card reader that instruct the authentication system how to retrieve the required information needed to authenticate a user. According to an embodiment, the configuration file contains commands the authentication module may use to retrieve the required information from a card comprising a type or data model unsupported by the default authentication module. The configuration file may also contain user-defined data models capable of being utilized by the authentication module.

According to an embodiment, separate user-defined configuration files reside on the printing device and are accessible by the smart card authentication module. One configuration file defines smart card models/types, data models, password options, and user credential retrieval commands for local authentication, i.e., authentication that does not require accessing a separate or remote authentication server. Another configuration file may define server addresses, protocol types, and data formats pertaining to remote authentication procedures. The correct configuration file to use may be based upon the card model and/or type.

In step 312, the smart card reader, according to instructions and data from the user-defined configuration file, accesses user credential data on the smart card. The user credential data can be predefined, as in supported by the default software, or customer defined using the configuration file. It may take the form of a user ID and password, a LDAP entry, a PKI certificate, or other form of identification. As part of this step or another step, a PIN code or similar data may be required to be entered prior to accessing the smart card.

In step 314, a check is made to see whether a valid response was received. If not, then an error message or similar feedback may be provided to the user and the card ejected.

In step 316, data is read pertaining to the remote authentication procedure. For example, authentication server addresses, protocol types, data formats and/or other information and read from a user-defined configuration file thereby enabling authentication with a server that may not be supported by the default software. For example, if a new server address or protocol were added to the authentication system, then prior to this approach every authentication module would need to be rewritten and recompiled to recognize this change. By using a user-definable configuration file, the changes may be dynamically added and supported.

In step 318, the authentication software communicates the retrieved credentials to the appropriate server with the correct protocol. As described earlier, the credential may comprise a user name/password pair, a LDAP entry, or server-based certificate authentication data.

In step 320, a check is made as to whether the data comparison results in a successful authentication. If the authentication is unsuccessful, then an error message or similar feedback may be provided to the user and the card ejected 322.

If authentication is successful, then in step 324 access is granted to the user commensurate with the user's authorized functions. For example, the printing device may use the user information to access a local function controlling database and determine the device functions that the user may utilize. This may be applied to various functions, such as color printing allowance or scan-to-email allowance. Other resource controlling functions or applications, such as an accounting system, may be built on top of the smart card authentication system.

V. Web-Based Interface

Figure 4:
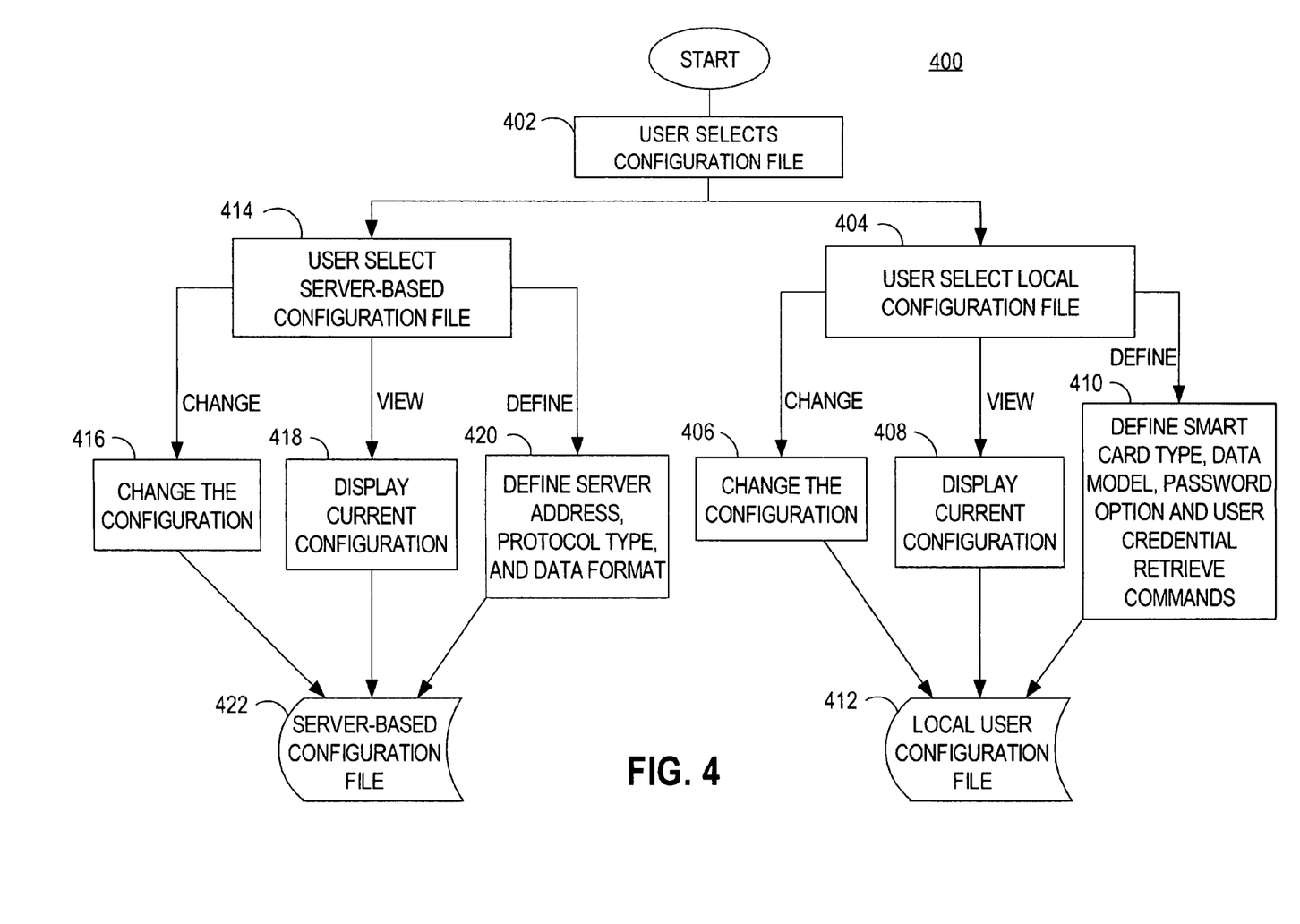
FIG. 4 is a flow diagram that depicts an approach for a web-based user interface, according to an embodiment of the invention.

FIG. 4 is a flow diagram 400 that depicts an approach configuring the user-definable configuration files used by the smart card authentication system as described herein using a web-based user interface. According to an embodiment, the web-based interface provides a visual utility to assist a user in configuring the user-definable configuration files. According to an embodiment, changes and additions to the configuration files are saved on the local storage of the printing device for use by the smart card authentication module executing in communication with the device.

The interface may be launched through any web browser and references the pre-defined directory and/or pages on the destination system. In step 402, a user chooses a configuration file to view, add entries to or otherwise change. According to an embodiment, separate configuration files exist for server authentication approaches and local authentication approaches. According to an embodiment, one file may be utilized for both functions. In step 404, a user selects the local user configuration file. This is in the case of separate configuration files for local versus server-based authentication. Once the local user configuration file is selected, the file is opened and the user may perform various tasks, such as changing the configuration 406, displaying the current configuration 408, and/or defining a new entry in the configuration file 410. When defining a new entry, the user may add information pertaining to smart card types, data models, password options, and user credential retrieval commands to be issues to the card reader. Other information is contemplated in various embodiments. Once the user finishes the action, the local user configuration file 412 is either saved or accessed.

Alternately, in the case of separate configuration files, in step 414, a user selects the server-based configuration file. This is in the case of separate configuration files for local versus server-based authentication. Once the server-based configuration file is selected, the file is opened and the user may perform various tasks, such as changing the configuration 416, displaying the current configuration 418, and/or defining a new entry in the configuration file 420. When defining a new entry, the user may add information pertaining to server addresses, protocol types, and data formats. Other information is contemplated in various embodiments. Once the user finishes the action, the server-based configuration file 422 is either saved or accessed.

VI. Implementation Mechanisms

Figure 5:
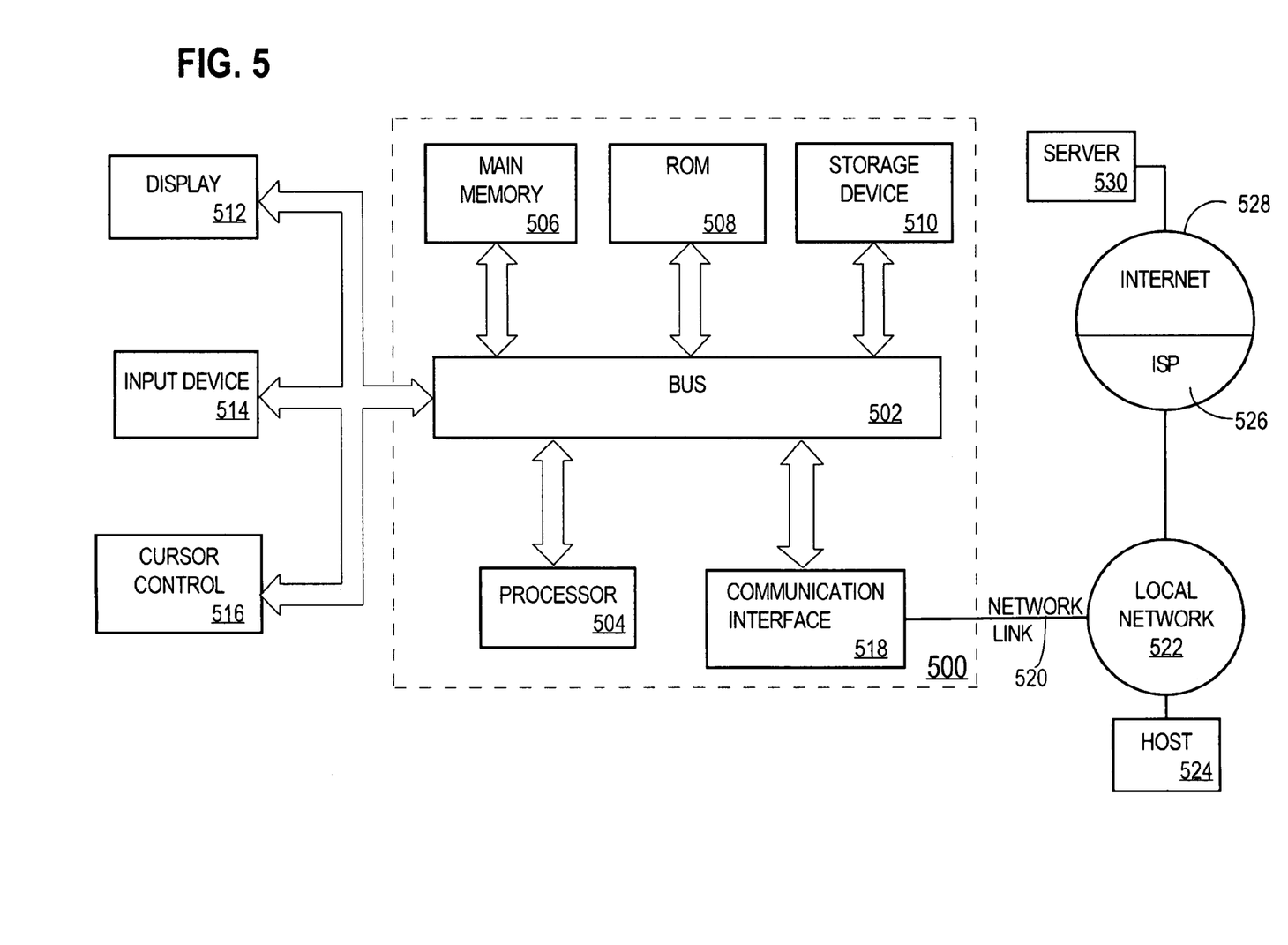
FIG. 5 is a block diagram of a computer system on which embodiments of the invention may be implemented.

Although primarily described herein in the context of smart card authentication systems controlling access to a printing device, the approach is applicable to any type of smart card authentication approach. The approach described herein and the various elements may be implemented in hardware, computer software or any combination of hardware and computer software on any type of computing platform. FIG. 5 is a block diagram that illustrates an example computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific fashion. In an embodiment implemented using computer system 500, various computer-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A smart card authentication device comprising:
   a smart card authentication module configured to:
      identify a smart card;
      determine whether a default configuration of the smart card authentication module supports the smart card;
      if the default configuration supports the smart card, then read authentication data from the smart card using instructions provided by the default configuration of the smart card authentication module;
      if the default configuration of the smart card authentication module does not support the smart card, then read data from a first separate, user-defined configuration data that is dynamically configurable and never compiled, the first separate, user-defined configuration data comprising instructions that allows the smart card authentication module to read data from a particular type of smart card;
      determine whether the data read from the first separate, user-defined configuration data supports the smart card;
      if the separate, user-defined configuration data supports the smart card, use the data read from the first separate, user-defined configuration data to read authentication data from the smart card;
      attempt to authenticate the smart card using the authentication data read from the smart card;
      if the authentication module authenticates by accessing a remote authentication device, then determine whether the default configuration of the smart card authentication module supports communication with the remote authentication device;
      if the remote authentication device is not supported by the default configuration, then read data from a second separate, user-defined configuration data that is dynamically configurable and never compiled, the second separate, user-defined configuration data comprising data to support communication with a remote authentication device; and
      use the data read from the second separate, user-defined configuration data to communicate with the remote authentication device to authenticate the smart card.

2. The authentication device as recited in claim 1, wherein at least one of the first separate, user-defined configuration data or the second separate, user-defined configuration data is stored locally on the smart card authentication device.

3. The authentication device as recited in claim 1, wherein at least one of the first separate, user-defined configuration data or the second separate, user-defined configuration data comprises data in an XML format.

4. The authentication device as recited in claim 1, wherein at least one of the first separate, user-defined configuration data or the second separate, user-defined configuration data comprises a text file.

5. The authentication device as recited in claim 1, wherein at least one of the first separate, user-defined configuration data or the second separate, user-defined configuration data contains data related to local user authentication.

6. The authentication device as recited in claim 1, wherein at least one of the first separate, user-defined configuration data or the second separate, user-defined configuration data contains data related to server-based authentication.

7. The authentication device as recited in claim 1, wherein at least one of the first separate, user-defined configuration data or the second separate, user-defined configuration data contains data related to both local user authentication and server-based authentication.

8. The authentication device as recited in claim 1, wherein at least one of the first separate, user-defined configuration data or the second separate, user-defined configuration data is editable.

9. The authentication device as recited in claim 1, wherein at least one of the first separate, user-defined configuration data or the second separate, user-defined configuration data is encrypted.

10. The authentication device as recited in claim 1, wherein the smart card authentication device is further configured to:
    if the smart card is successfully authenticated, control access to various functions of a printing device communicatively coupled to the authentication device executing the smart card authentication module.

11. The authentication device as recited in claim 1, wherein the authentication device is further configured to provide a web-based interface for viewing and editing at least one of the first separate, user-defined configuration data or the second separate, user-defined configuration data.

12. The authentication device as recited in claim 1, wherein the authentication data read from the smart card comprises a digital certificate.

13. The authentication device as recited in claim 1, wherein the authentication data read from the smart card comprises LDAP data.

14. The authentication device as recited in claim 1, wherein the authentication device is further configured to require entry of a security code prior to accessing the authentication data from the smart card.

15. The authentication device as recited in claim 14, wherein the security code is a PIN number.

16. The authentication device as recited in claim 1, wherein the first separate, user-defined configuration data and the second separate, user-defined configuration data are the same file.

17. The authentication device as recited in claim 1, wherein the first separate, user-defined configuration data and the second separate, user-defined configuration data are different files.

18. The authentication device as recited in claim 1, wherein the first separate, user-defined configuration data or the second separate, user-defined configuration data comprise instructions to support data of a different data model.

19. A method for smart card authentication, the method comprising:
- identifying a smart card, on which authentication data is stored, inserted into a smart card reading apparatus;
- executing default instructions for reading data from the smart card;
- determining whether the authentication data stored on the smart card is capable of being read by the default instructions, and if so, reading the authentication data from the smart card;
- if the authentication data stored on the smart card is not capable of being read based upon the default instructions, reading user-defined configuration data, separate from the default instructions, that is dynamically configurable and never compiled, the user-defined configuration data comprising instructions for reading the authentication data stored on the smart card;
- authenticating the smart card;
- wherein if authenticating the smart card is performed by accessing a remote authentication device, then determining whether a default configuration supports communication with the remote authentication device;
- if the remote authentication device is not supported by the default configuration, then reading data from user-defined configuration data, separate from the default instructions, comprising data to support communication with a remote authentication device; and
- using the data read from the user-defined configuration data to communicate with the remote authentication device to authenticate the smart card.

20. A computer-readable medium carrying one or more sequences of instructions for smart card authentication, wherein execution of the one or more sequences of instructions by one or more processors causes the one or more processors to perform the steps of:
- identifying a smart card, on which authentication data is stored, inserted into a smart card reading apparatus;
- executing default instructions for reading data from the smart card;
- determining whether the authentication data stored on the smart card is capable of being read based upon the default instructions, and if so, reading the authentication data from the smart card;
- if the authentication data stored on the smart card is not capable of being read by the default instructions, reading user-defined configuration data, separate from the default instructions, that is dynamically configurable and never compiled, the user-defined configuration data comprising instructions for reading the authentication data stored on the smart card;
- authenticating the smart card;
- wherein if authenticating the smart card is performed by accessing a remote authentication device, then determining whether a default configuration supports communication with the remote authentication device;
- if the remote authentication device is not supported by the default configuration, then reading data from user-defined configuration data, separate from the default instructions, comprising data to support communication with a remote authentication device; and
- using the data read from the user-defined configuration data to communicate with the remote authentication device to authenticate the smart card.

* * * * *